United States Patent
Salcudean et al.

(10) Patent No.: US 6,339,969 B1
(45) Date of Patent: Jan. 22, 2002

(54) THREE-DEGREE-OF-FREEDOM PARALLEL PLANAR MANIPULATOR

(76) Inventors: Septimiu E. Salcudean, 4338 West 2nd Avenue, Vancouver, B.C. (CA), V6R 1K3; Leo J. Stocco, 205-4$^{th}$ Avenue, New Westminster, B.C. (CA), V3L 1N5; Icarus C. N. Chau, 2228 East 11$^{th}$ Avenue, Vancouver, B.C. (CA), V5N 1Z6

(*) Notice: Subject to any disclaimer, the term of this patent is extended or adjusted under 35 U.S.C. 154(b) by 0 days.

(21) Appl. No.: 09/584,201

(22) Filed: May 31, 2000

Related U.S. Application Data
(60) Provisional application No. 60/137,489, filed on Jun. 4, 1999.

(51) Int. Cl.$^7$ .................................. B25J 11/00
(52) U.S. Cl. ................ 74/490.05; 74/490.01; 901/15
(58) Field of Search .............. 74/490.01, 490.03, 74/490.05; 414/728; 901/2, 14, 15, 23

(56) References Cited

U.S. PATENT DOCUMENTS

| | | | |
|---|---|---|---|
| 4,693,666 A | | 9/1987 | Gorin |
| 5,539,297 A | | 7/1996 | Reboulet |
| 5,673,595 A | | 10/1997 | Hui et al. |
| 5,713,757 A | | 2/1998 | Cho |
| 5,893,296 A | * | 4/1999 | Rosheim ............. 74/490.03 |
| 6,116,844 A | * | 9/2000 | Hayward ............. 901/15 |

FOREIGN PATENT DOCUMENTS

DE    26 59 245    * 7/1977

* cited by examiner

*Primary Examiner*—Rodney H Bonck
(74) *Attorney, Agent, or Firm*—C. A. Rowley (57) ABSTRACT

A pair of five-bar mechanisms having their pivotal axes parallel are each mounted at one end to a base and are interconnected at their other ends by a crankshaft to obtain a manipulator generating three degrees of freedom planar motion of an end-effector. Redundant actuation may be used to generate an unlimited rotation range and an extensible link in the crankshaft may be used to provide adjustable torque capabilities during operation.

17 Claims, 13 Drawing Sheets

THREE-DEGREE-OF-FREEDOM PARALLEL PLANAR MANIPULATOR

The benefit under title 35 United States Code §119(e) based on U.S. provisional application No. 60/137,489 filed Jun. 4, 1999 is claimed.

FIELD OF THE INVENTION

This invention relates to a robotic manipulator more particularly to such manipulators constructed to control the movement of an end-effector in three degrees of freedom.

BACKGROUND TO THE PRESENT INVENTION

Many attempts have been made to design mechanisms for the three degree of freedom (3-DOF) control of a moveable end-effector. The applications have been diverse, from electronic component assemblies to realistic force-reflecting master hand controllers. The following provide examples of such three degree of freedom manipulators.

SCARA Robot (U.S. Pat. No. 4,693,666)

One of the oldest mechanisms for 3-DOF planar manipulation is the SCARA robot. It is commonly used in tasks such as automated circuit board stuffing. SCARA robots are serial mechanisms having parallel actuation axes that allow translation of an end-effector in space as well as rotation of the end-effector about an axis parallel to the actuation axes. Typical arrangements involve rotational shoulder and elbow actuators that position a two-axis wrist that rotates and translates a gripper along an axis parallel to the shoulder and elbow axes. Typically the proximal actuators carry the distal ones. The mass of the distal actuators, as well as the mass of the stiff structure required to carry them, limit achievable accelerations. In order to alleviate this problem, four-bar linkages or belt transmissions have been used to place both the shoulder and elbow actuator in the robot base. The robot moving mass is substantially reduced by this technique. However, the rotational and translational gripper actuators still have to be carried by the robot arm.

Substrate Feeder (U.S. Pat. No. 5,713,717)

The substrate feeder provides 3-DOF planar motion through parallel actuation. It can move quickly due to its parallel actuation.

Parallel Manipulator (U.S. Pat. No. 5,539,291)

This device performs 3-DOF translation/rotation manipulations using a parallel structure but operates over a cylindrical surface rather than in the plane. No orientation of the gripper in order to perform an operation such as bolt tightening is available with this structure.

4-DOF Manipulator (U.S. Pat. No. 5,673,595)

The 4-DOF Manipulator uses 2 five-bar linkages in parallel to provide spatial positioning as well as one degree of rotation. This invention describes a pair of links connected to each other at their distal ends by a single passive rotational joint to form a variable angle vertex. The proximal ends of the links are connected via universal joints to planar translational movers such as five-bar linkages. The planar translational movers translate and orient the pair of links in a plane. The vertex angle and therefore its height is defined by the distance between the planar translational movers. Although the translational mobility of this mechanism is essentially that of a SCARA robot, the end-effector of this mechanism does not have a fixed orientation with respect to a working plane and the mechanism does not provide unlimited rotation range about an axis. As well, there are many passive joints defining the mechanism vertex and hence the end-effector position, leading to play and therefore inaccuracies in its position.

BRIEF DESCRIPTION OF THE PRESENT INVENTION

It is therefore an object of the present invention to provide an improved manipulator providing three degree-of-freedom planar translation and orientation to an end-effector while minimizing the disadvantages discussed above with respect to known manipulators.

It is an object of the invention to provide a manipulator wherein all of the actuators are attached to the base, resulting in low mass, which allows for high speed and high acceleration operation.

The primary objective to provide a manipulator with actuators fixedly attached to the base and having unlimited rotation range.

A secondary object is to provide a manipulator with the ability to alter its angular motion transmission ratio through the inclusion of an extensible link.

An object is to produce a device having fewer geometric design parameters, thus easing its design for a specific application.

A further object of the present invention is to provide a manipulator that permits simplified control computations by allowing analytical solutions of both the inverse and forward kinematics which avoids the need for complex control calculations that plague many parallel devices.

Broadly the present invention relates to a three degree of freedom manipulator comprising a base, a pair of off set substantially parallel rotary joints, a crankshaft mounted in said pair of rotary joints, said crankshaft having an interconnecting portion extending between said pair of rotary joints, a pair of joint moving means one to independently move each of said rotary joints in a plane perpendicular to the rotary axes of said joints, said pair of joint moving means each being mounted on said base and drive means on said base for independently and controllably driving each of said joint moving means to independently move each of said rotary joints.

Preferably each of said joint moving means comprises a five-bar linkage composed of a pair of proximal links, each said proximal link pivotally connected at one end to said base for pivotal movement on a first pivotal axis, all of said first pivotal axes for said pair of joint moving means being substantially parallel to each other and a pair of distal links each of which is pivotally connected on a second pivotal axis to its link of said pair of proximal links, said second pivotal axes being spaced from and parallel to said first pivotal axes, said pair of distal links of one of said pair of joint moving means having one said pair of rotary joints adjacent to their ends remote from said their second pivotal axis and said pair of distal links of the other of said pair of joint moving means having the other of said pair of rotary joints adjacent to their ends remote from said their second pivotal axis, axes of rotation of said pivotal joints and of said pair of rotary joints being substantially parallel.

Preferably said drive means includes a separate drive means for each of said proximal links of each of said pair of joint moving means around its said first pivotal axis.

Preferably said three degree of freedom manipulator will further include an end effector, and said crankshaft will include an offsetting portion extending laterally beyond one of said pair of rotary joints, said end effector being mounted on said offsetting portion.

Preferably said interconnecting portion includes an extendable section, which may be changed in length, to change the spacing between said first and second rotational axes.

Preferably said extensible section is formed by an axially extendable link.

Preferably said extensible section is formed by means of a pair of links interconnected by a further rotational joint permitting rotation about an axis of rotation parallel to said axes of rotation of said pivotal joints and of said pair of rotary joints.

Preferably each of said joint moving means and said drive means comprises at least one prismatic actuator means for moving each of said rotary joints.

Preferably each of said joint moving means comprises a pair of interacting prismatic actuators.

BRIEF DESCRIPTION OF THE DRAWING

Further features, objects and advantages will be evident from the following detailed description of the preferred embodiments of the present invention taken in conjunction with the accompanying drawings in which.

DESCRIPTION THE PREFERRED EMBODIMENTS

The three degrees of freedom (3 DOF) of the manipulator of the present invention include two degrees of translation and one degree of rotation with a rotation axis that is perpendicular to the plane defined by the two translational degrees of freedom. These three degrees of freedom, therefore, restrict the motion of the device to a plane.

Figure 1A:
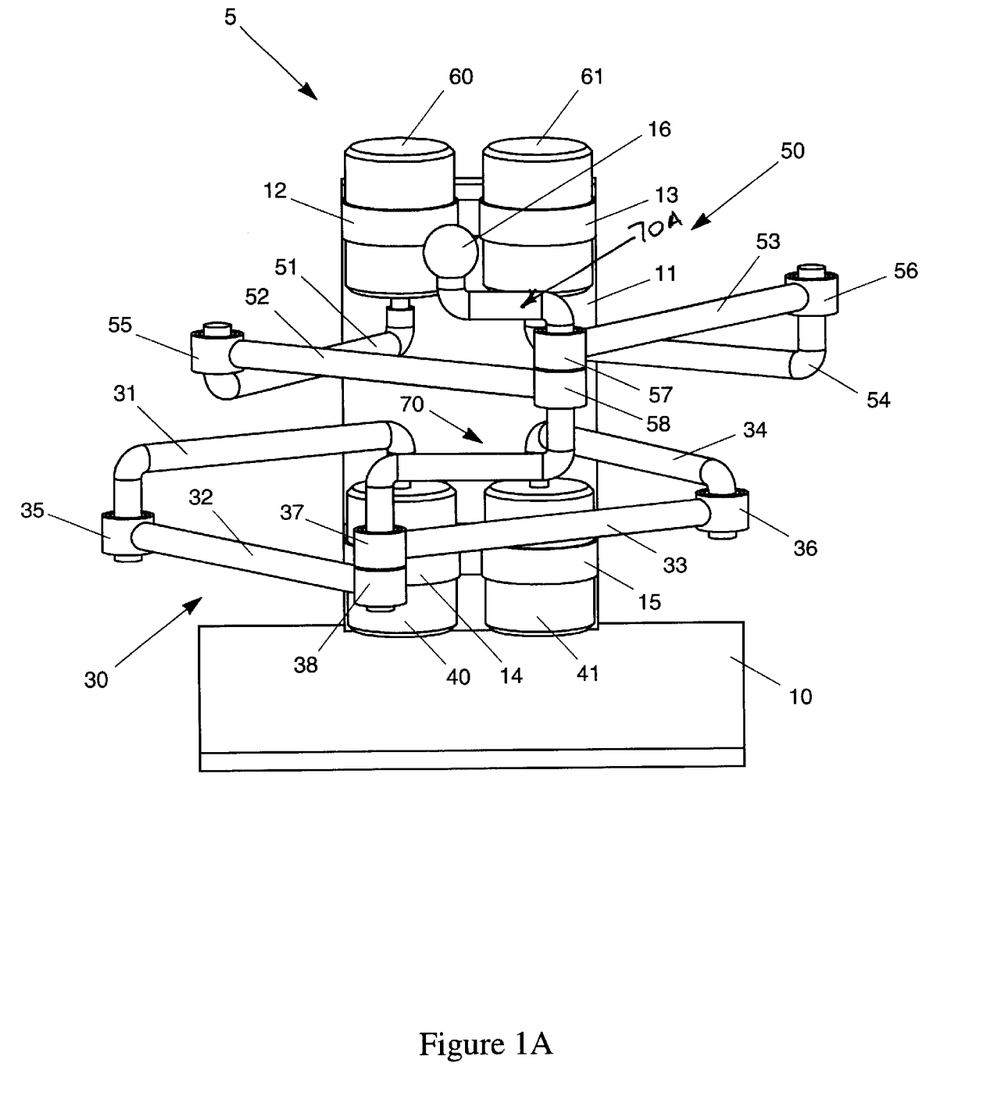
FIG. 1A is a front orthographic view of parallel manipulator of the present invention with the end-effector in a central position.
Figure 1B:
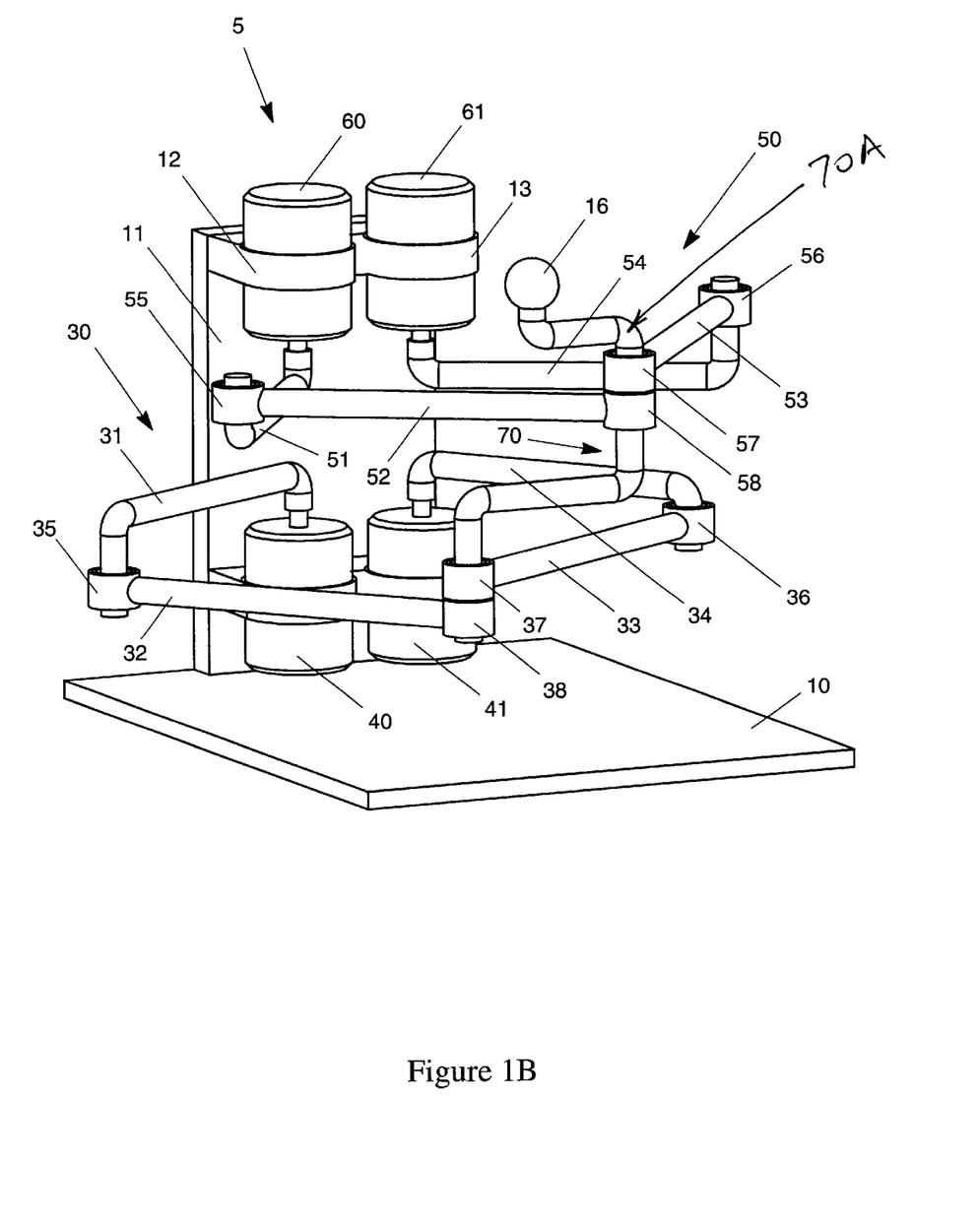
FIG. 1B is a front orthographic view of parallel manipulator of the present invention with the end-effector mover to the right relative to the position shown in FIG. 1A.

A robotic manipulator, shown generally at 5, made according to the present invention, is illustrated in FIGS. (1A) to (1C) Manipulator 5 includes a support 10 or frame upon connected to which is a base 11 on which ends of a pair of five-bar linkages 30 and 50 are mounted by means of clamps 12, 13, 14 and 15 as will be discussed below. The opposite ends of the five-bar linkages 30 and 50 are interconnected by a crank-shaft 70 assembly (see FIG. 1C) to which the opposite ends are connected on rotational axes formed by the joints 37, 38, 57 and 58. A handle or end-effector 16 is offset from and connected to the crank-shaft 70 by an offsetting portion 70A of the crankshaft 70.

Device 5 forms a three degree of freedom parallel robot. Two degrees of translation are provided when five-bar linkages 30 and 50 move journals 71 and 72 of crankshaft 70 (see FIG. 1C) in the same direction. One degree of rotation is provided when five-bar linkages 30 and 50 move journals 71 and 72 of crankshaft 70 in opposing directions.

Five-bar linkage 30 is composed of two motors 40, 41 held to the base 11 by the clamps 14 and 15 respectively and four linkages, 31, 32, 33 and 34 pivotably interconnected on parallel axes formed by the bearings 35, 36, 37 and 38. The axes of rotation of the shafts of the motors 40 and 41 are parallel and are parallel to the parallel axes between the links formed by the bearings 35, 36, 37 and 38. The proximal links 31 and 34 are fixedly attached to the rotating shafts of motors 40 and 41, respectively and extend at right angles from the shafts of the motors 40 and 41, and protrude in a direction that is generally away from base 11.

Pin joints, also known as the elbow joints formed with the bearings 35 and 36, attach distal links 32 and 33 to proximal links 31 and 34, respectively. The distal links rotate in the same plane as the proximal links. The two distal links, 32 and 33, are joined to journal 71 of crankshaft 70 by pin joints formed with bearings 37 and 38, known as the wrist joints. Journal 71 of the crankshaft 70 is free to rotate independently of distal links 32 and 33.

The upper half of the overall structure, five-bar linkage 50, is symmetric with respect to the lower half formed by the five-bar linkage 30.

Five-bar linkage 50 is composed of two motors 60, 61 and four linkages, 51, 52, 53 and 54. Motors 60 and 61 are fixedly attached to base 11 by clamps 12 and 13 axes of rotation of the shafts of motors 40 and 41. Proximal links 51 and 54 are fixed to the rotating shafts of motors 60 and 61, respectively, extend at right angles to their respective shaft, and protrude in a direction that is generally away from base 11. Pin joints, also known as the elbow joints formed with the bearings 55 and 56, rotatably connect distal links 52 and 53 to proximal links 51 and 54, respectively. The distal links 52 and 53 rotate in the same plane as the proximal links 51 and 54. The two distal links, 52 and 53, are joined to journal 72 of crankshaft 70 by pin joints formed with bearings 57 and 58, known as the wrist joints. Journal 72 is free to rotate independently of distal links 52 and 53.

A handle or end-effector 16 is connected to crankshaft 70 and preferably is off set from the rotational axis of the journal 72 in the bearings 57 and 58. This handle or end-effector 16 is representative of any number of payloads that can be placed on device 5. When operated as a handle, the handle 16 may be used as a hand controller; the device can also be used as an active positioner.

Figure 1C:
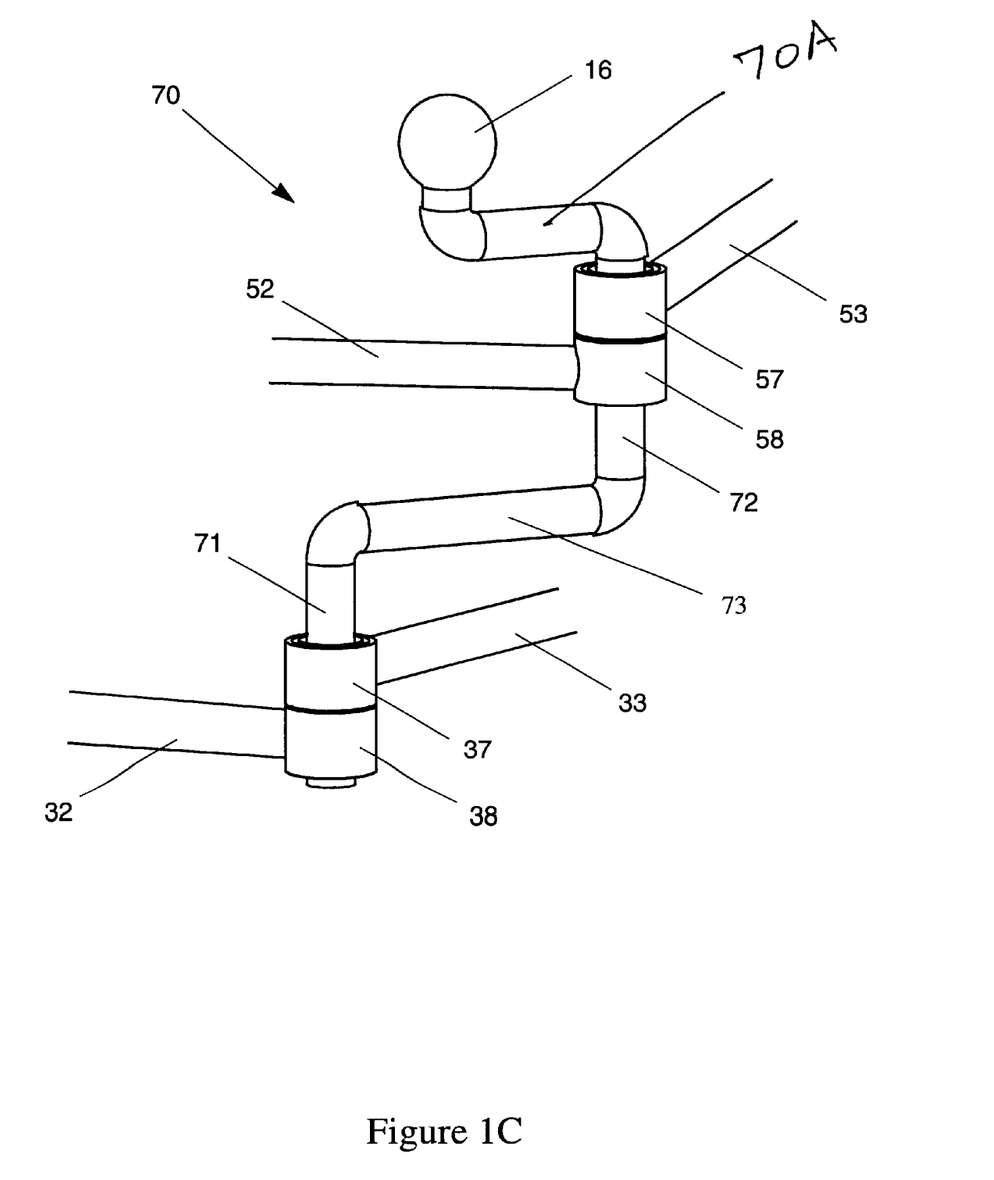
FIG. 1C is an orthographic view of the crankshaft assembly of the manipulator.

Operation of the Embodiment Illustrated in FIGS. 1A to 1C

As shown in FIGS. (1A) and (1B), each five-bar linkage (30 and 50) has two motors 40 and 41 and 60 and 61 respectively at its base 11 to rotate the proximal arms 31 and 34 and 51 and 54 respectively, which in turn moves the distal arms 32 and 33 and 52 and 53 respectively in accordance with the degree of rotation of their respective proximal arms to thereby drive the journals 71 and 72 of crankshaft 70 via their connection to the distal arms 32 and 33 and 52 and 53. Such movement the arms move the journals 71 and 72 in the plane of the linkage.

As above described the distal end of each five-bar linkage (30 and 50) is attached to the journals or rotary joints 71 and 72 of the crankshaft 70 by means of wrist joints 37, 38, 57 and 58, respectively. Each linkage (30 and 50) can execute motions in two degrees of freedom, but the two linkages 30 and 50 are tied together at crankshaft 70, so three degree of freedom motion of the end-effector 16 results—two degrees of freedom in translation, and one degree of freedom in rotation. Translation occurs when linkages 30 and 50 move crankshaft journals 71 and 72 in a cooperative fashion along similarly directed trajectories. Rotation occurs when linkages 30 and 50 move crankshaft journals 71 and 72 in a differential fashion along oppositely directed trajectories that are mutually perpendicular to the central bar 73 in crankshaft 70 connecting the two rotary joints 71 and 72 (see FIG. 1C).

Consider the operation of one of the five-bar linkages 30 or 50 in detail. The two motors 40 and 41 of five-bar linkage 30 permit wrist joints 37 and 38 of the linkage to be moved in the plane of linkage 30. These motors 40 and 41 may rotate proximal links 31 and 34 independently which, in turn, force distal links 32 and 33 to rotate in a constrained manner, revolving about pin joints 35, 36, 37 and 38. The two motors 60 and 61 operate in essentially the same manner as the motors 40 and 41 to control movement of the five-bar linkage 50 in the plane of the linkage 50.

Figure 2A:
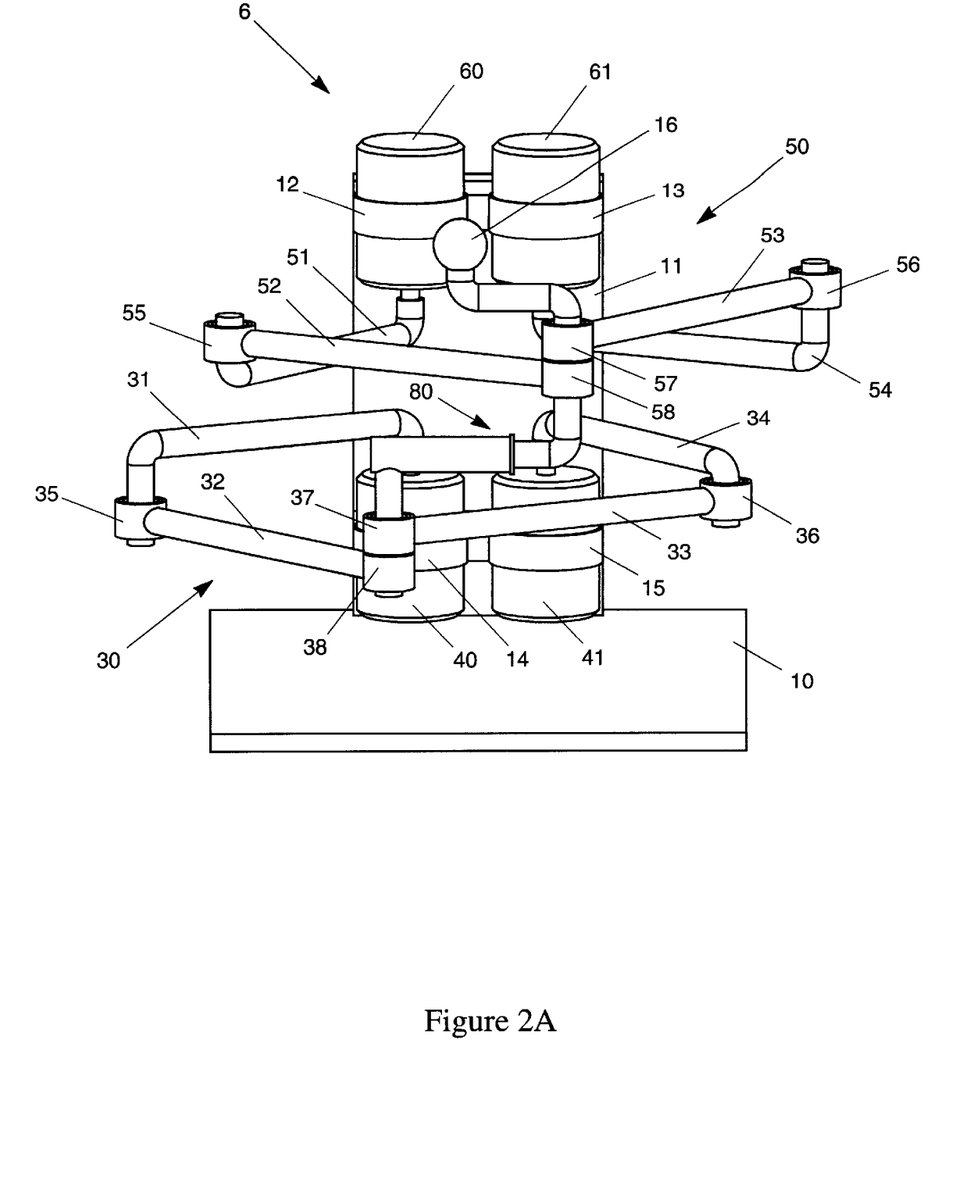
FIG. 2A is a front orthographic view of a modified form of the parallel manipulator of the present invention wherein the crankshaft is provided as an extensible link.
Figure 2B:
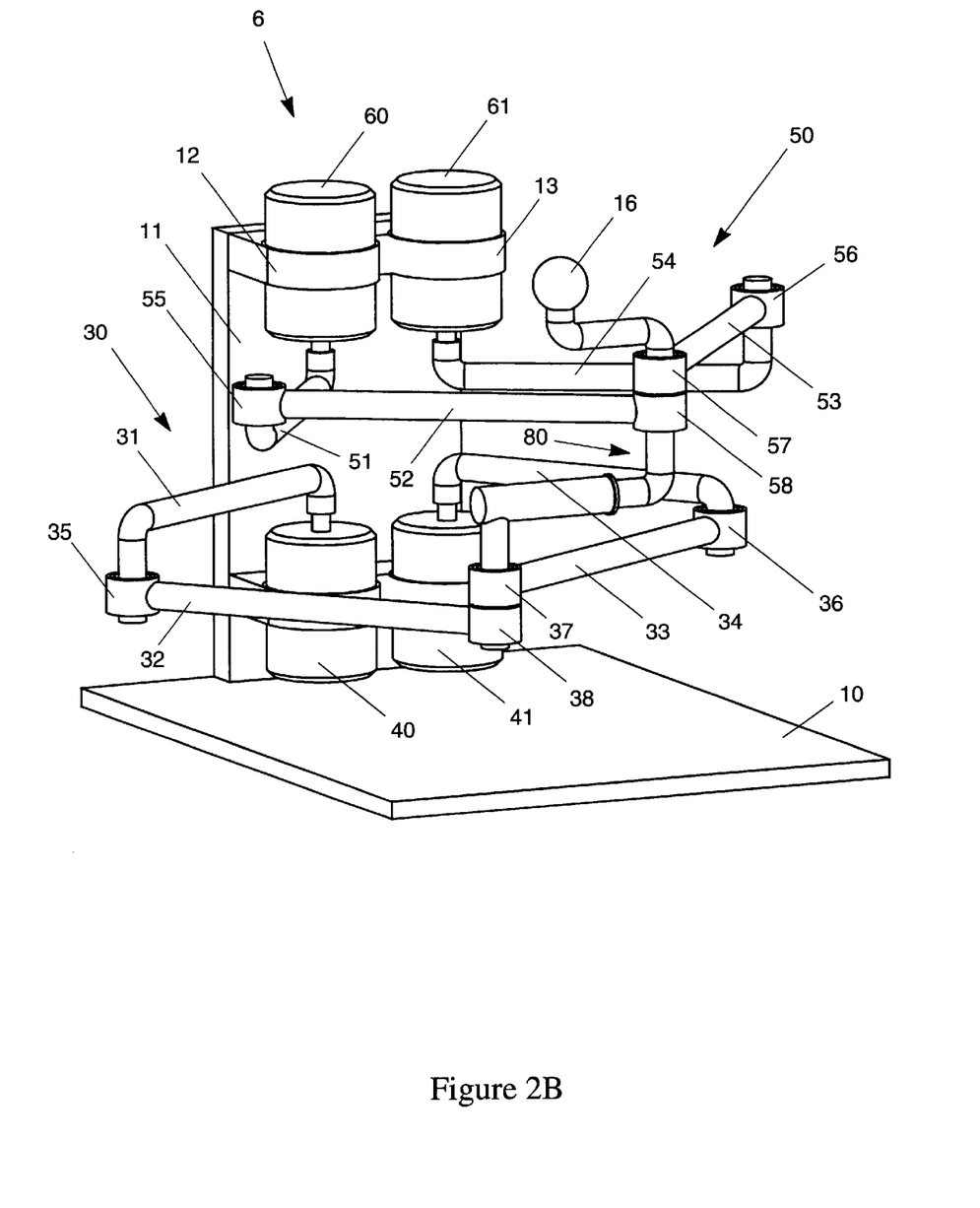
FIG. 2B is a front orthographic view of parallel manipulator of FIG. 2A with the end-effector shifted to the right.
Figure 2C:
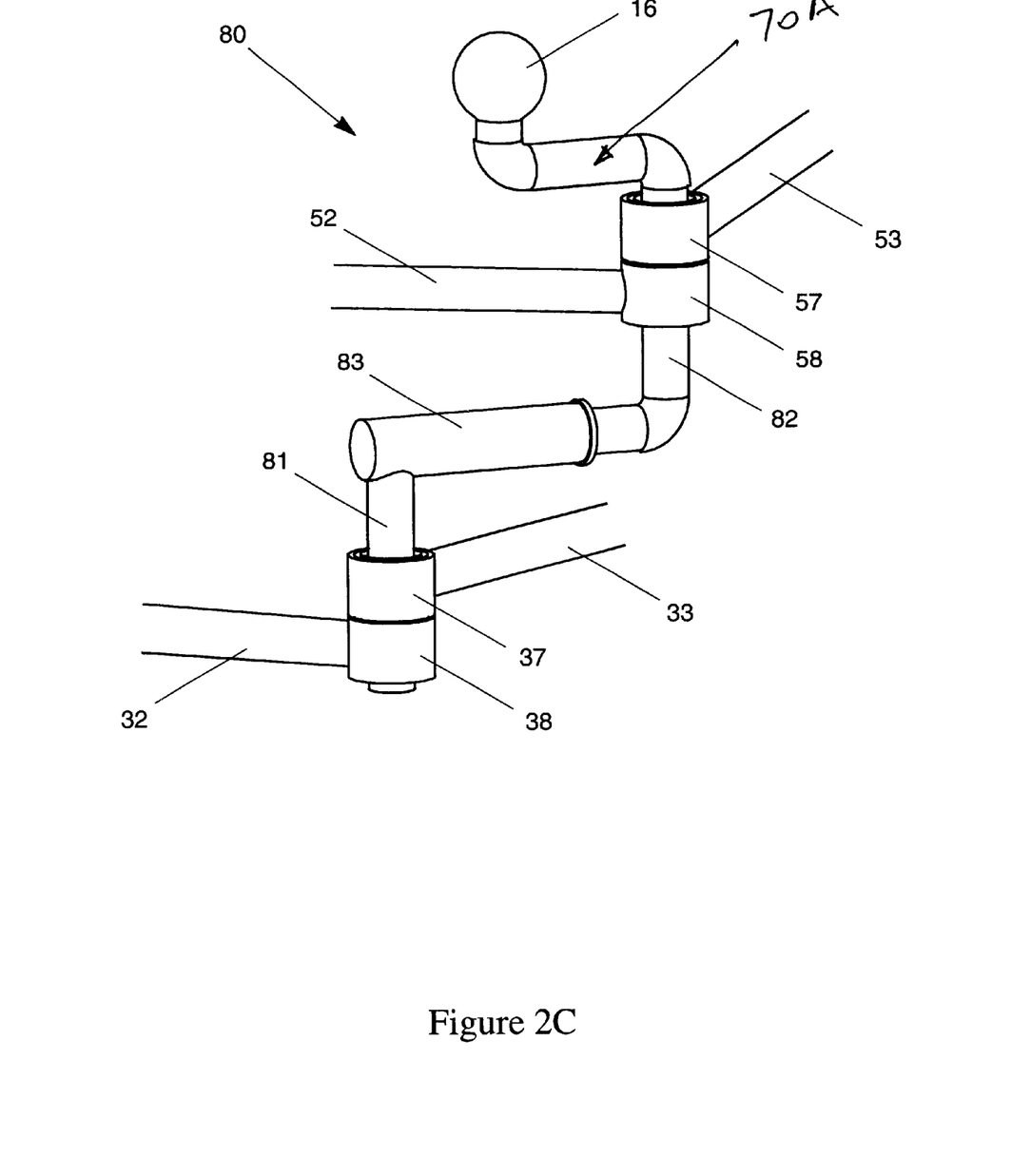
FIG. 2C is a front orthographic view of crankshaft with extensible prismatic link assembly of the FIGS. 2A and 2B embodiment.

Embodiment of FIGS. 2A to 2C

An alternative embodiment of the parallel manipulator 5, is generally indicated at 6 in FIGS. (2A) and (2B) is shown in FIGS. (2A) through (2C). FIG. 2A is kinematically equivalent to FIG. 1A, except that the fixed length central bar 73 of crankshaft 70 is replaced by an axially extensible link 83 in the crankshaft 80. The horizontal, central bar 73 in crankshaft 70 that joins journals or rotary joints 71 and 72 is fixed in length (see FIG. 1C), but the central bar 83 in crankshaft 80 that joins journals 81 and 82 (equivalent to journals or rotary joints 71 and 72 respectively) incorporates a variable length linear bearing or slider. The length of link 83 can, therefore, extend or contract to any length permitted by the motion range of its linear bearing or slider (see FIG. 2C).

Operation of the Embodiment of FIGS. 2A to 2C

The embodiment of FIGS. (2A) to (2C) operates in the same way as the embodiment of FIG. 1A, except that five-bar linkage 30 is free to move relative to five-bar linkage 50 in such a way that neither the position nor the orientation of handle 16 is changed. This occurs when the distal end of the linkage 30 (defined by the bearings 37 and 38) and the distal end of the link 50 (defined by the bearings 57 and 58) move relative to each other along the longitudinal axis of extensible link 83, thereby changing (either extending or reducing) the axial length of the link 83. Changes in the length of extensible crankshaft 80 have a direct effect on the leverage that linkage 30 has to apply torque to handle 16, thereby altering the physical capabilities of the device.

Figure 3A:
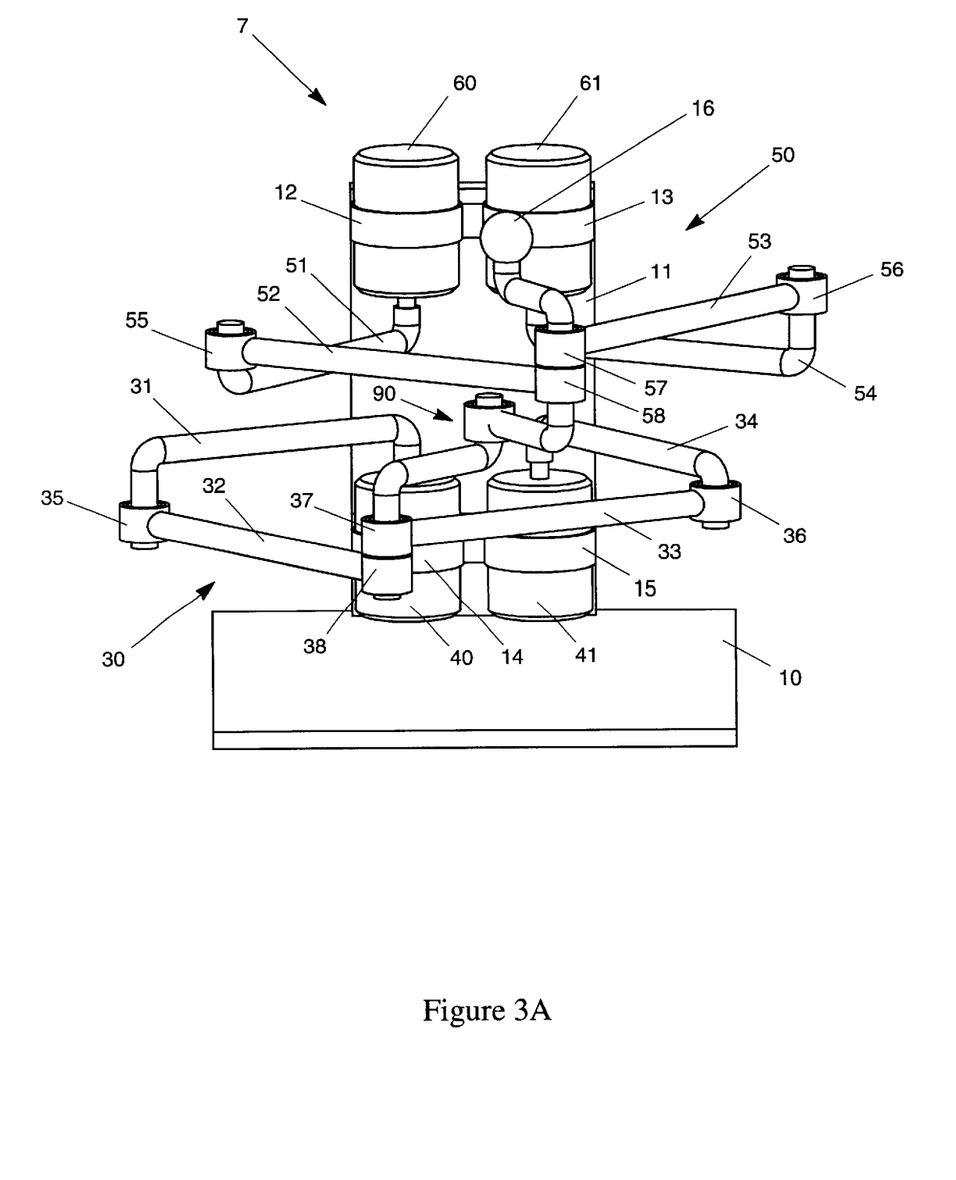
FIG. 3A is a front orthographic view of parallel manipulator with a two-part crankshaft incorporating an elbow link.
Figure 3B:
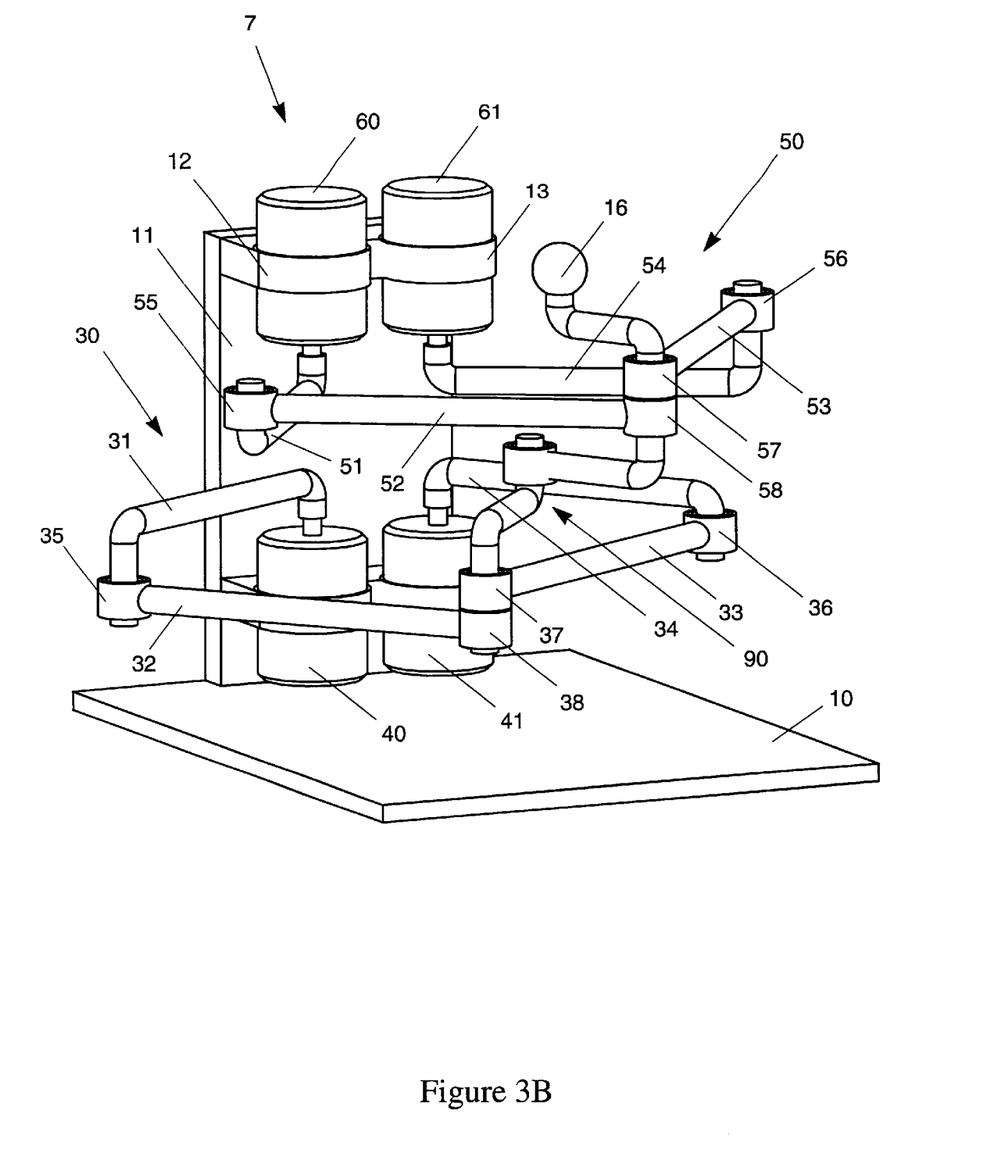
FIG. 3B is a front orthographic view of the parallel manipulator of FIG. 3A with the end-effector shifted to the right.
Figure 3C:
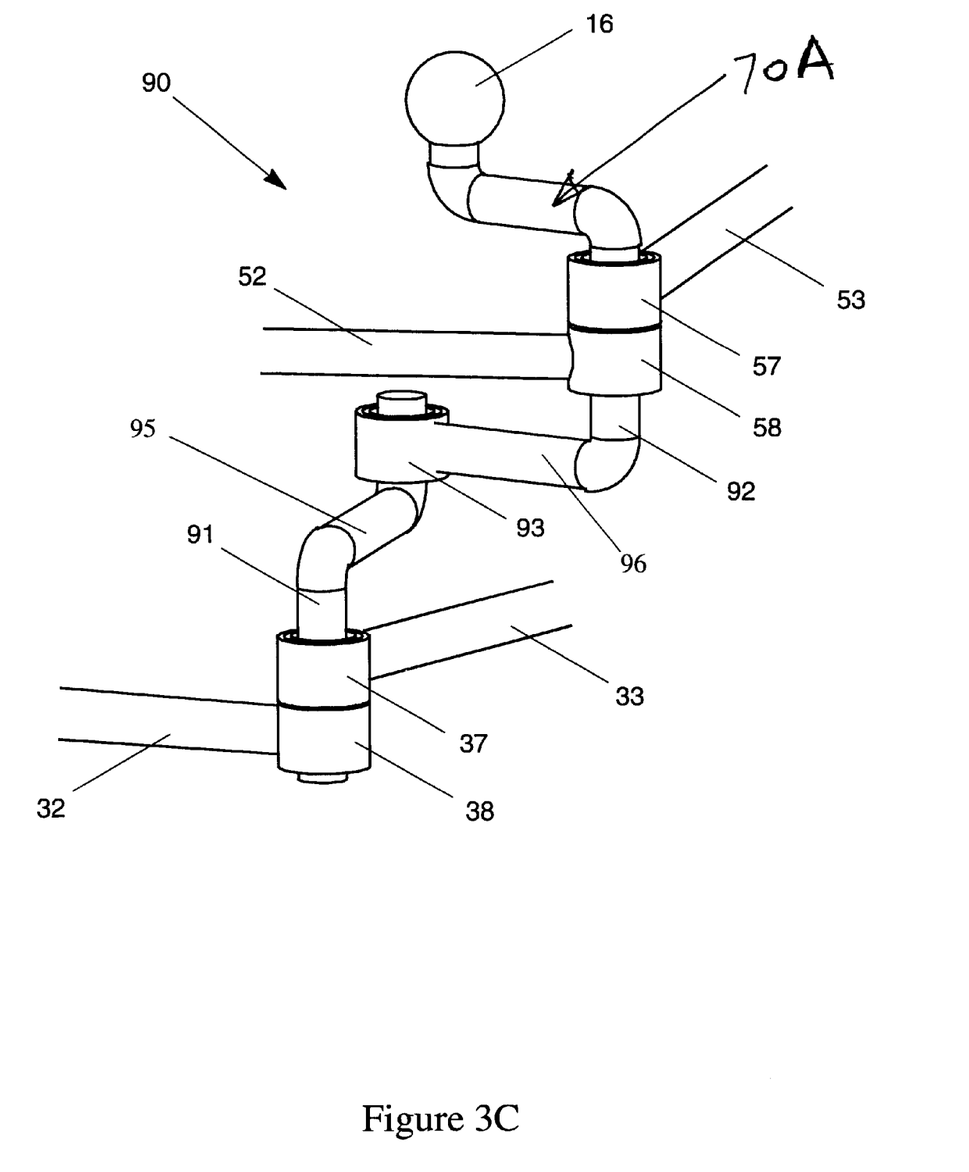
FIG. 3C is a front orthographic view of the crankshaft with extensible elbow link assembly as used in the FIGS. (3A) and (3B) embodiment.

Embodiment of FIGS. 3A to 3C

An embodiment of the parallel manipulator 7 shown in FIGS. (3A) through (3C). FIG. 3A is kinematically equivalent to FIG. 2A, except that an extensible elbow crankshaft 90 replaces the extensible prismatic link 83 of crankshaft 80.

Whereas the extensible central bar 83 in crankshaft 80 that joins journals 81 and 82 incorporates a passive, prismatic, extensible link 83 (see FIG. 2C), the central bar in crankshaft 90 that joins journals 91 and 92 (equivalent to journals or rotary joints 71 and 72 respectively) is formed by a pair of independent bars 95 and 96 connected by a passive pin joint 93 (see FIG. 3C) that permits rotation around the axis of the joint 93.

Operation of the Embodiment of FIGS. 3A to 3C

The alternative embodiment, generally shown at 7 in FIGS. (3A) to (3C) operates in the same way as the alternative embodiment, generally shown at 6 in FIG. 2A, except that in order to change the length of extensible crankshaft 90, for example five-bar linkage 30 moves relative to five-bar linkage 50 (or vice versa) in such a way that crankshaft journal 91 rotates about the axis of pin joint 93, while leaving both the position and orientation of journal 92 unaffected. Similarly to FIG. 2A this relative movement changes in the length of extensible crankshaft 90 i.e. spacing between the journals 91 and 92 and has a direct effect on the leverage that linkage 30 has to apply torque to handle 16, thereby altering the physical capabilities of the device.

Figure 4:
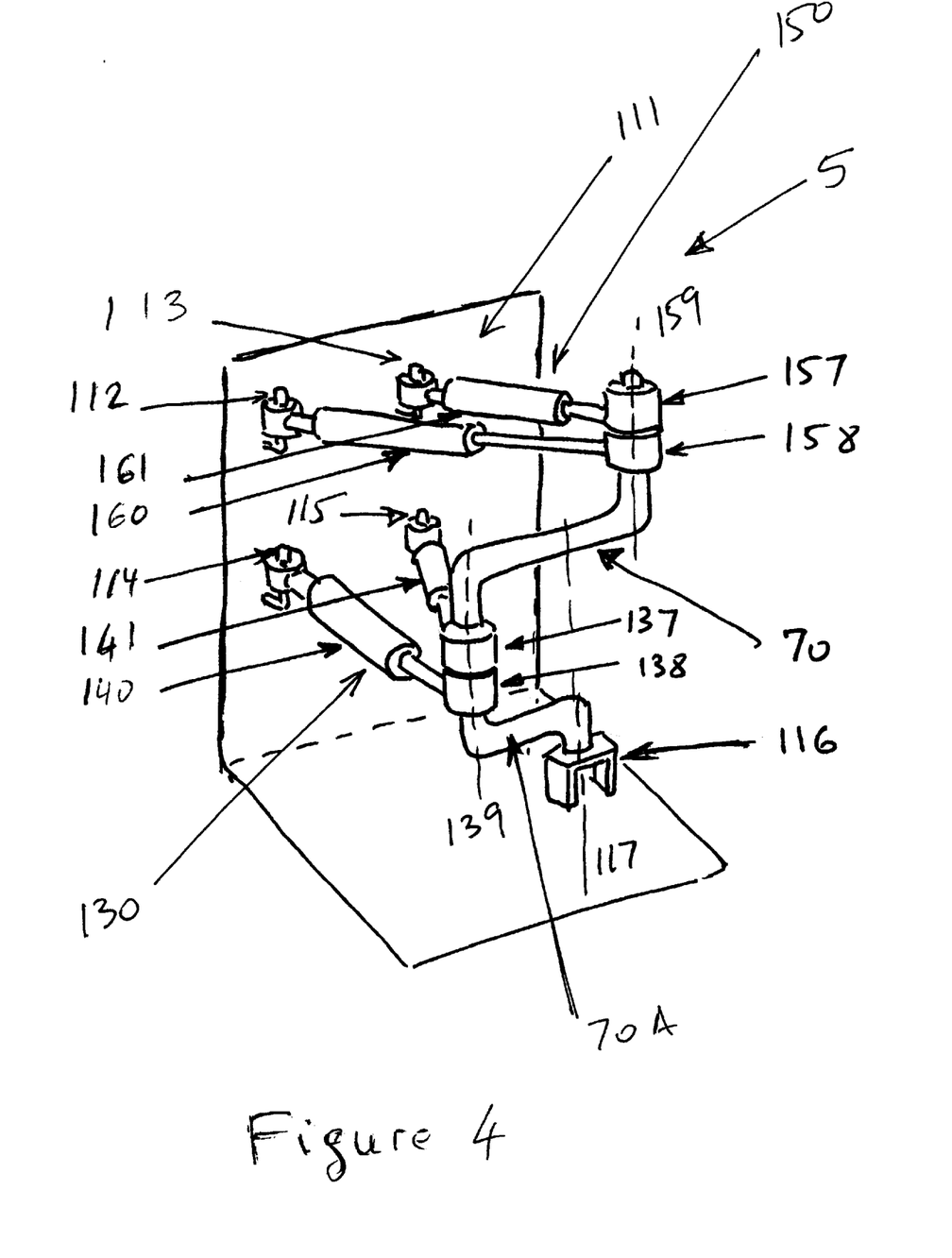
FIG. 4 is a front orthographic view of an alternative embodiment of the present invention.

Embodiment of FIG. 4

The three-degree-of-freedom planar motion of an end-effector can be achieved by other mechanisms using the same crank shaft concept described above.

An alternative embodiment of the present invention is shown in FIG. 4 which shows a three-degree-of-freedom robot 5 providing translation and orientation of an end-effector 116 mounted on the offset portion 70A of the crankshaft 70 in a plane and having all its actuators in the base. The journals 71 and 72 of the crank shaft 70 pass through two pairs of rotational joints 137, 138 and 157, 158 connected to the distal ends of pairs 130 and 150 of prismatic actuators such as hydraulic or pneumatic actuators or jacks 140, 141 and 160, 161. These actuators are in turn connected to a fixed base 111 by rotational joints 112, 113 and 114, 115. A gripper 116 is shown attached to the offset portion 70A of the crankshaft 70 with the gripper axis 117 aligned with the middle of the crank shaft.

Operation of the Embodiment of FIG. 4

The intersection point of the joint axis 139 with the plane of the prismatic actuators 140 and 141 is determined by the length of the actuators 140 and 141. In particular, this intersection point is determined by the intersection of two circles centered at the actuator base joints 114 and 115, of radii equal to the lengths of the actuators 140 and 141, respectively. Similarly, the intersection point of the joint axis 159 with the plane of the actuators 160 and 161 is determined by the length of the actuators 160 and 161. When axes 139 and 159 move in the same direction, the crank shaft 70 is translated in the same direction. When axes 139 and 159 move in different directions, the crank shaft 70 also changes orientation. The gripper 116 can thus be positioned and oriented in a working plane parallel to the axes 139, 159 and the axes of the rotational joints 112,113,114 and 115 that connect the linear actuators 160, 161, 140 and 141 to the base 11, respectively. Since the two positioning mechanisms 130 and 150 move in different but parallel planes, the gripper rotation range about its axis 117 is unlimited.

It is apparent that the above geometrical constraints and description outline the concepts of different embodiments of a novel three degree of freedom manipulator having the following advantages:

a larger workspace free of singularities and collisions between linkages.

the low mass and high precision and stiffness associated with a parallel device.

actuator redundancy that not only enhances the dynamic capabilities with little additional moving mass, but also increases the non-singular workspace.

a limitless motion range in its angular degree of freedom.

The present invention could be used in any application where stiffness and precision are of utmost importance and a parallel robot is preferred. It could be used as a master and/or slave robot in a teleoperation system. It could be used in virtual reality systems, which incorporate robotic hand controllers or motion simulators. It can be used to create a force feedback input/output computer pointing device which has unlimited applications including human perception research, interactive computer-aided design, interactive video games, interactive workspace managers and any other software application which can benefit from the incorporation of three dimensional translation/rotation tactile information exchange.

Some or all of the actuators could be replaced with locking joints to create a three degree of freedom positioning table, or with passive joints to create a three degree of freedom position sensor.

The present invention may be used as an assembly robot or be made at a small scale for use as a three degree of freedom wrist for a serial robot. It could be made at a large scale for use in aircraft, car, trucking or other heavy-equipment simulators.

This parallel redundant planar robot of the present invention may also be used for component placement. Typically, component placement applications require large and fast planar translation movements with fine motion rotation that could be achieved by the robot described in this invention.

An additional z-axis translational motor and position sensor, with the translation axis in parallel to the axes of motors 40, 41, 60 and 61 could be added as a payload to the robot end-effector 16, thus realizing all the degrees of freedom encountered in typical x-y-z-theta_z "SCARA" robots (see for, example, "Robot Dynamics and Control", by M. W. Spong and M. Vidyasagar, John Wiley and Sons, 1989). Such a robot could pick components from feeders and move them very fast to a placement location. With carefully designed component feeders, the z-axis actuator may not have to be controlled in position mode, but could simple shuttle between an "up" (for component transportation) and "down" (for component pick-up and placement) position. In particular, for component placement applications, a simple air-cylinder may be sufficient as the z-actuator.

Figure 5:
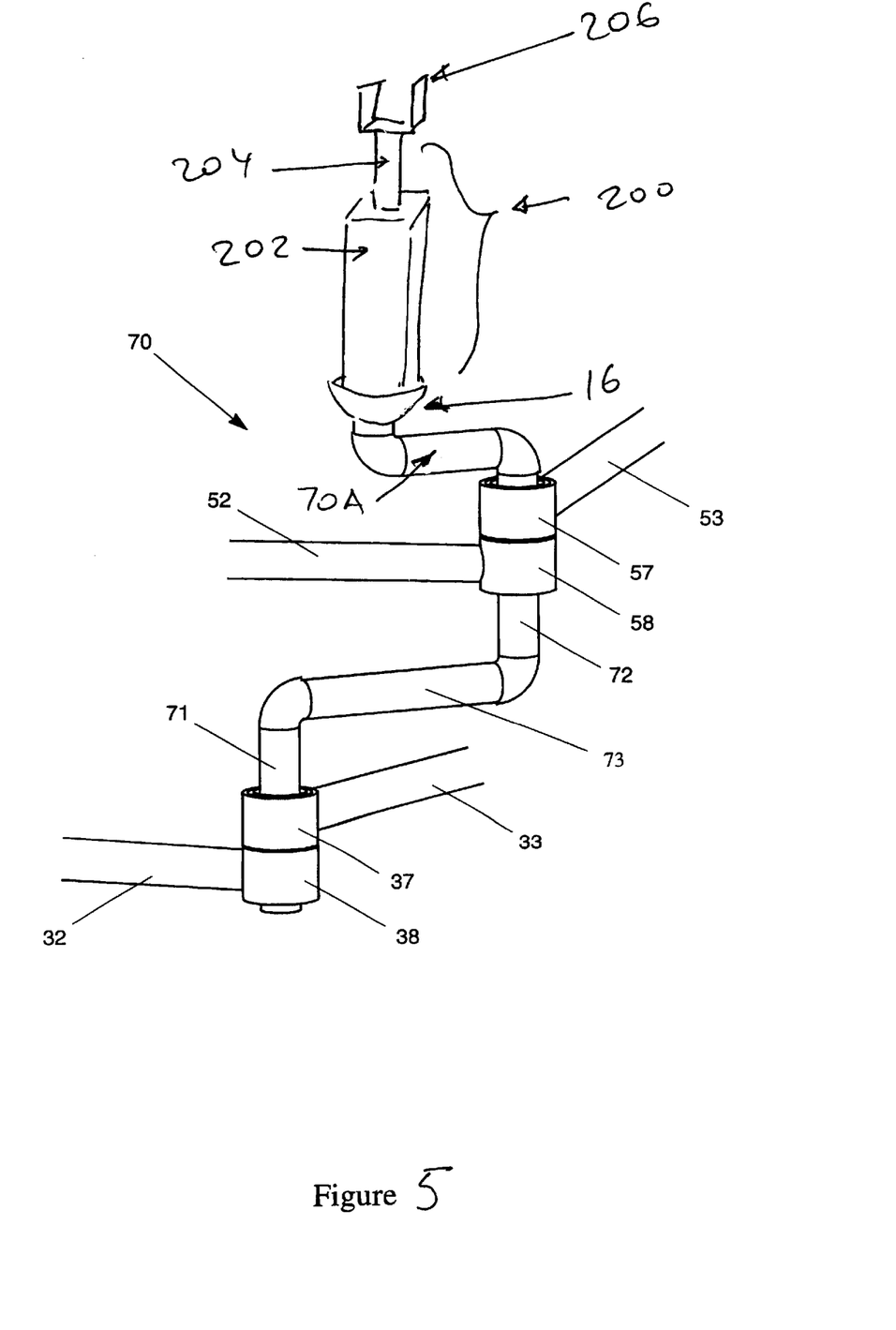
FIG. 5 illustrates a linear actuator added to the robot end-effector.

FIG. 5 illustrates a linear actuator added to the robot end-effector 16 attached to the crank shaft 70 to create a manipulator that is functionally equivalent to the classic SCARA robot. A linear motor, air cylinder, or hydraulic cylinder 200 is mounted onto the crank shaft end 16. A gripper 206 is attached to the actuator rod 204 that can move parallel to the crank shaft journal or rotary axes 71 and 72.

Such a four-degree-of-freedom robot would have the advantage that all but one of its actuators would be in the base, and thus would be capable of very high accelerations.

An alternative embodiment to a SCARA robot based on the manipulator that is the subject of this invention would have the target board with components be moved along a direction parallel to the robot 5 motor axes 40, 41, 60 and 61 by a separate z-axis stage.

Figure 6:
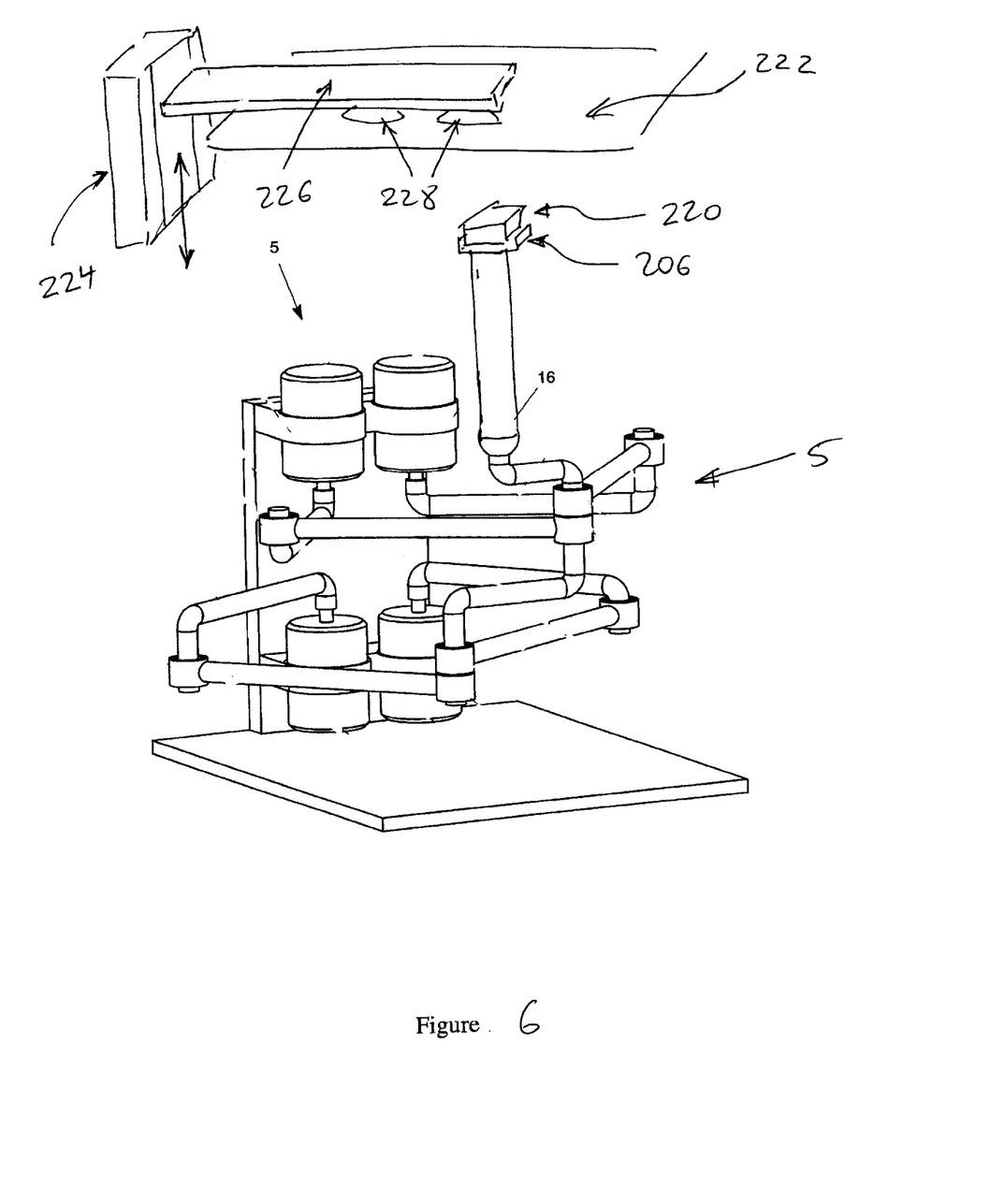
FIG. 6 is a view showing the embodiment of FIG. 5 applied to a selected task.

This is illustrated in FIG. 6. A z-axis motor 224 imparts translational motion to a support member 226 to which a printed circuit board 222 attaches via attachment suction cups 228 or via other means. The component 220 is carried by a gripper 206 attached to the manipulator end-effector 16 of the parallel manipulator 5. This might allow faster component placement, as all the actuators used in the system would be fixed. In a typical operation, the 3-DOF robots would pick each component from feeders designed to deliver them to the plane of its end-effector. The 3-DOF robot would then position the component with very high acceleration at a given position and orientation in its plane of operation. The motion of the component carrier would be coordinated with the motion of the 3-DOF robots so the target board would be moved against the component after the component has arrived at its desired location.

In yet another use of the 3-DOF planar robots that is the subject of this invention, the robot end-effector 16 would itself carry the target board on which components must be placed. A z-axis feeder that can move components in a direction parallel to the motor axes 40, 41, 60 and 61 would place components against the target board as the board is translated and oriented in the planar robot's workspace. In particular, the z-axis feeder could be similar in construction to a component turret as can be found in "chip-shooting" machines that are in common use today.

The 3-DOF robot that is the subject of this invention could be used as a kit for educational purposes. Many courses offered by universities or colleges in robotics do not have adequate laboratories for experiments. The mechanism presented in this invention could be used as a kit consisting of two pantograph devices, devices 30 and 50 from FIG. 1A, a fixed length crankshaft as shown in FIG. 1C, and/or a passively telescoping crankshaft as shown in FIGS. (2C) and (3C). Students could study relatively simple kinematics and dynamics of mechanisms using these pantograph mechanisms, then advance to the study of collaborating mechanisms by using the crankshafts to connect the two robots.

Figure 7:
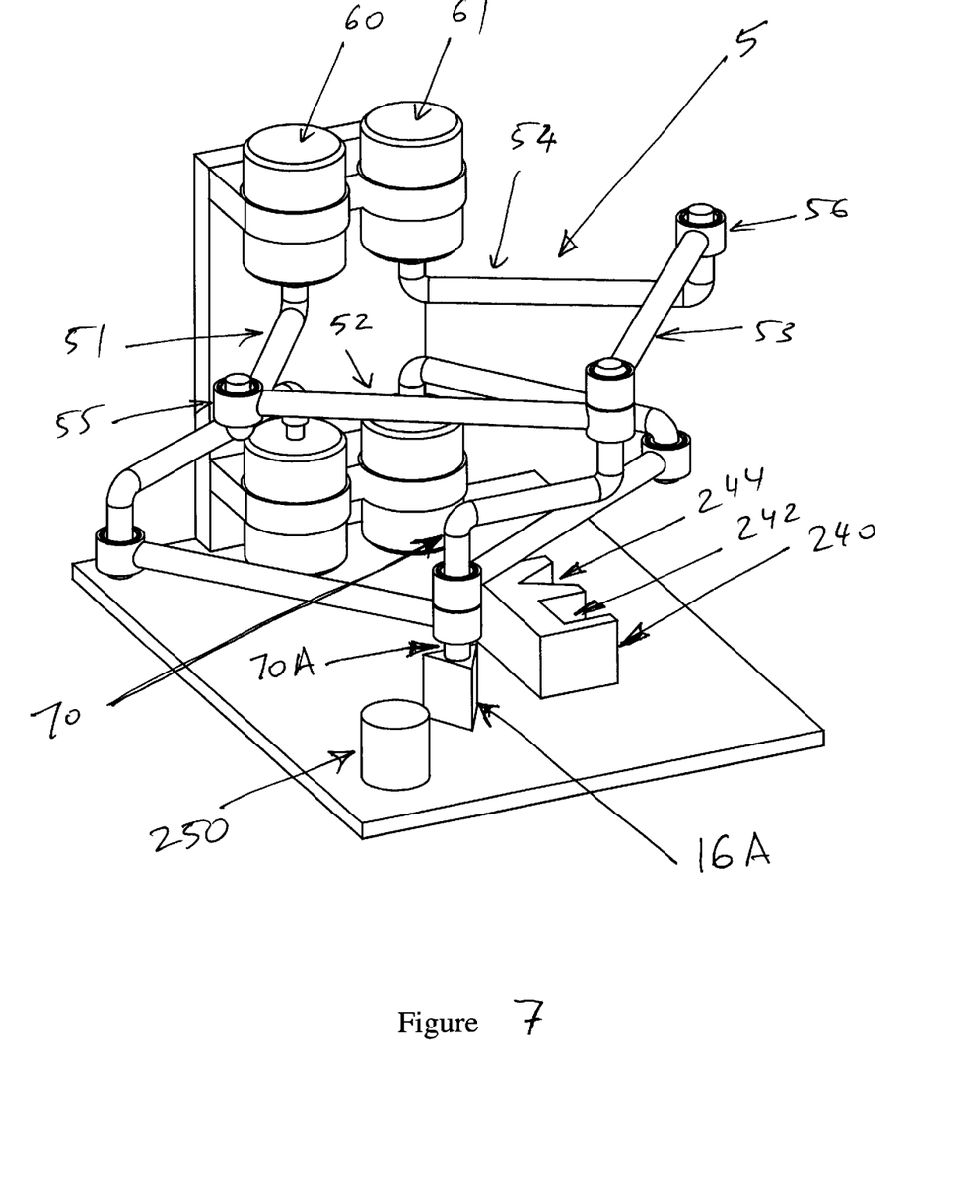
FIG. 7 is a front orthographic view showing the invention applied to an educational application.

The planar 3-DOF structure is particularly useful in studying contact and assembly tasks taking place in the plane. This could be accomplished by mounting an object 16A (such as a parallelepiped or an extruded triangular section) on the end-effector 16 and mounting fixed world objects such as a circular cylinder 250 or a parallelepiped 240 with a rectangular cut 242 or a triangular cut 244 in the robot workspace plane (see FIG. 7) such that the end-effector object can interact with the fixed world objects in three degrees of freedom. In particular, tasks such as planar compliant motion for polishing, deburring, remote-center-of-compliance motion for "peg-in-hole" insertion tasks could be studied in this fashion. Indeed, the object 16A carried by the robot can be inserted in the cut 244 or component 240 by using a compliant motion (see for, example, "Robot Dynamics and Control", by M. W. Spong and M. Vidyasagar, John Wiley and Sons, 1989). As well, the same object could be used for surface following around the cylinder 250. It is clear that the "workspace objects" 240, 250 can be endowed with different surface friction properties, while the holes 242 in the workspace objects can be made to match. The dimensions of the gripper object 16A with small tolerances so as to make insertion tasks more or less difficult. The planar pantographs of such an educational kit could be used without the crankshaft attachment between them in teleoperation experiments with one of the pantographs (say, 30) used as a 2-DOF master and the other pantograph (say, 50) used a 2-DOF slave robot.

For more advanced studies of dynamic interaction, the 3-DOF device that is the subject of this invention could be used as a haptic or force-feedback interface for planar manipulator In particular, one could study how the dynamics of a planar virtual world could be implemented in a stable manner in the presence of realistic coupling between translation and orientation. Thus, in a manner analogous to the use of the 3-DOF device as a robot that makes a moveable object interact with fixed world objects, the 3-DOF device could be used to simulate this interaction of a virtual object attached to its end-effector with virtual fixed objects in a planar virtual world. No other haptic device that is presently on the market is able to do that.

The 3-DOF planar device presented in this invention could be used as a haptic or force-feedback planar-motion joystick for manipulating real or virtual devices that move in a plane.

For example, the robot could be used to send commands to the controller of an excavator in order to position the excavator bucket. Bucket force information could in turn be "displayed" by the handle of the device, allowing the operator to feel the forces and torques acting in the plane of the excavator arm. The simulator of an excavator and a bucket-soil simulator could be used instead of the real excavator to allow an operator to interact with a virtual excavator performing virtual tasks for training and evaluation purposes. The bucket-soil simulator could include various types of soil, pipe and rock cross-sections, etc., to try and simulate a realistic digging environment.

As another example, the device could be used as a force-feedback mouse, with the motion of the end-effector 16 being mapped to the motion of a planar object displayed on the computer screen. Forces of interaction between graphical objects displayed on the screen could be "rendered" to the user's hand by appropriate control of the actuators of the device.

Having described the invention modifications will be evident to those skilled in the art without departing from the spirit of the invention as defined in the appended claims.

We claim:

1. A three degree of freedom manipulator comprising a base, a pair of off set substantially parallel rotary joints, a crankshaft mounted in said pair of rotary joints, said crankshaft having an interconnecting portion extending between said pair of rotary joints, a pair of joint moving means one to independently move each of said rotary joints in a plane perpendicular to the rotary axes of said joint, said pair of joint moving means each being mounted on said base and said joint moving means each having a drive means mounted on said base for independently and controllably driving each of said joint moving means to independently move each of said rotary joints and wherein each of said drive means comprises a pair of independently driven drivers.

2. A three of freedom manipulator as defined in claim 1 wherein each of said joint moving means comprises a five-bar linkage composed of a pair of proximal links, each said proximal link pivotally connected at one end to said base for pivotal movement on a first pivotal axis, all of said first pivotal axes for said pair of joint moving means being substantially parallel to each other, and a pair of distal links each of which is pivotally connected on a second pivotal axis to its link of said pair of proximal links, said second pivotal axes being spaced from and parallel to said first pivotal axes.

3. A three degree of freedom manipulator as defined in claim 2 wherein said pair of distal links of one of said pair of joint moving means having one of said pair of rotary joints adjacent to their ends remote from said their second pivotal axis and said pair of distal links of the other of said pair of joint moving means having the other of said pair of rotary joints adjacent to their ends remote from their said second pivotal axis, axes of rotation of said pivotal joints and of said pair of rotary joints being substantially parallel.

4. A three degree of freedom manipulator as defined in claim 2 wherein each of said independently driven drivers drives a different one of said proximal links of said pairs of joint moving means around its said first pivotal axis.

5. A three degree of freedom manipulator as defined in claim 3 wherein each of said independently driven drivers drives a different one of said proximal links of said pairs of joint moving means around its said first pivotal axis.

6. A three degree of freedom manipulator as defined in claim 2 wherein said three degree of freedom manipulator will further include an end effector, and said crankshaft will include an offsetting portion extending laterally beyond one of said pairs of rotary joints, said end effector being mounted on said offsetting portion.

7. A three degree of freedom manipulator as defined in claim 3 wherein said three degree of freedom manipulator will further include an end effector, and said crankshaft will include an offsetting portion extending laterally beyond one of said pairs of rotary joints, said end effector being mounted on said offsetting portion.

8. A three degree of freedom manipulator as defined in claim 4 wherein said three degree of freedom manipulator will further include an end effector, and said crankshaft will include an offsetting portion extending laterally beyond one of said pairs of rotary joints, said end effector being mounted on said offsetting portion.

9. A three degree of freedom manipulator as defined in claim 5 wherein said three degree of freedom manipulator will further include an end effector, and said crankshaft will include an offsetting portion extending laterally beyond one of said pairs of rotary joints, said end effector being mounted on said offsetting portion.

10. A three degree of freedom manipulator as defined in claim 1 wherein at least one of said independently driven drivers comprises prismatic actuator means for moving its said rotary joints.

11. A three degree of freedom manipulator as defined in claim 10 wherein each of said pairs of independently driven drivers comprises a pair of interacting prismatic actuators.

12. A three degree of freedom manipulator as defined in claim 10 wherein said three degree of freedom manipulator will further include an end effector, and said crankshaft will include an offsetting portion extending laterally beyond one of said pairs of rotary joints, said end effector being mounted on said offsetting portion.

13. A three degree of freedom manipulator as defined in claim 11 wherein said three degree of freedom manipulator will further include an end effector, and said crankshaft will include an offsetting portion extending laterally beyond one of said pairs of rotary joints, said end effector being mounted on said offsetting portion.

14. A three degree of freedom manipulator as defined in claim 1 wherein said three degree of freedom manipulator will further include an end effector, and said crankshaft will include an offsetting portion extending laterally beyond one of said pairs of rotary joints, said end effector being mounted on said offsetting portion.

15. A three degree of freedom manipulator as defined in any one of claims 1 to 14 wherein said interconnecting portion includes an extendable section, which may be changed in length, to change the spacing between said first and second rotational axes.

16. A three degree of freedom manipulator as defined in claim 15 wherein said extensible section is formed by an axially extendable link.

17. A three degree of freedom manipulator as defined in claim 15 wherein said extensible section is formed by means of a pair of links interconnected by a further rotational joint permitting rotation about an axis of rotation parallel to said axes of rotation of said pivotal joints and of said pair of rotary joints.

* * * * *

UNITED STATES PATENT AND TRADEMARK OFFICE
CERTIFICATE OF CORRECTION

PATENT NO. : 6,339,969 B1
DATED : January 22, 2002
INVENTOR(S) : Salcudean et al.

It is certified that error appears in the above-identified patent and that said Letters Patent is hereby corrected as shown below:

Title page,
Item [*], Notice, delete the phrase "by 0 days" and insert -- by 7 days --

Signed and Sealed this

Twenty-first Day of September, 2004

JON W. DUDAS
*Director of the United States Patent and Trademark Office*